United States Patent [19]

Dezelan

[11] 4,107,924

[45] Aug. 22, 1978

[54] PUMP UPGRADING SYSTEM

[75] Inventor: Joseph E. Dezelan, Western Springs, Ill.

[73] Assignee: Caterpillar Tractor Co., Peoria, Ill.

[21] Appl. No.: 791,901

[22] Filed: Apr. 28, 1977

[51] Int. Cl.[2] .................... F16H 39/46; F15B 13/06

[52] U.S. Cl. .................................... 60/445; 60/452; 60/484; 417/218

[58] Field of Search ................ 60/420, 426, 427, 445, 60/452, 484; 417/212, 218

[56] References Cited

U.S. PATENT DOCUMENTS

| | | | |
|---|---|---|---|
| 2,333,530 | 11/1943 | Ernst | 60/427 |
| 2,443,345 | 6/1948 | Ernst | 60/382 X |
| 2,462,971 | 3/1949 | Huber | 60/427 |
| 3,890,783 | 6/1975 | Allen et al. | 60/420 |

*Primary Examiner*—Edgar W. Geoghegan

*Attorney, Agent, or Firm*—Phillips, Moore, Weissenberger, Lempio & Strabala

[57] ABSTRACT

A multi-range pressure compensated fluid delivery system gives output flow over at least two pressure ranges. The system comprises a prime mover driven variable displacement pump having an inlet from a source of hydraulic fluid and a delivery outlet. A delivery circuit from the output has at least two work circuits selectively connected thereto. A first of the circuits is operable up to a first pressure and a second of the circuits is operable only up to a second lower pressure. An actuator system controls pump displacement responsive to a pressure applied thereto. A system selectively applies a first signal determined by the first pressure to the actuator system to adjust the operating pressure of the pump. A device reduces the first pressure to the second pressure responsive to connection of the second circuit to the delivery circuit to thereby decrease the maximum compensated pressure setting of the pump.

27 Claims, 2 Drawing Figures

PUMP UPGRADING SYSTEM

BACKGROUND OF THE INVENTION

1. Field of the Invention

The invention is concerned with a multi-range compensated fluid delivery system which is operable over at least two independent pressure ranges. For example, the delivery system is useable on earthworking vehicles such as motorgraders wherein, for example, a front wheel drive may require relatively high pressure operation under some circumstances. The system of the present invention allows such pressures to be applied at the operators command yet protects other work elements in the system from being damaged by excess pressure by providing a safety circuit which reduces the pump output pressure and hence the pressure in the front wheel drive circuit whenever other implements are being driven by the system.

2. Prior Art

Variable displacement pumps are often utilized in current machinery since their flow output can be reduced to a minimum when there is no flow requirement in the fluid delivery circuits which they supply while still maintaining a positive pressure in the circuit with minimum horsepower consumption. For example, in one such system a pump is employed and the pressure level in the fluid delivery circuit is employed to control the displacement of the pump. By utilizing pump output pressure to control the displacement of the pump, system operating pressure is maintained when all the work circuits are inactive with near zero displacement of the pump, as it need only replenish the leakage in the delivery circuit to maintain the system pressure. Under such conditions the forces controlling pump displacement are counterbalanced and a reduction in pressure when a work circuit is operated will cause the pump to increase displacement to meet the increased flow demands. This system, as well as other similar systems are often referred to as pressure compensated delivery systems because the output flow is pressure dependent.

Also, since pump displacement can be varied, such systems are less dependent on engine r.p.m. and offer uniform response in work circuits over wide variation of engine speeds. In addition such systems provide faster response as they can be economically operated at a positive pressure at or near operating pressure.

Dual range pressure dependent variable flow fluid delivery systems are also known. Such systems can operate at two separate and distinct pressure levels with full pressure compensation at both levels. The use of an electric clutch interposed between the power takeoff and the hydraulic pump which provides fluid to hydraulic lift cylinders is also known. The clutch in one such system cannot be actuated unless the gear shift lever is in neutral position whereby the clutch energizing contacts are closed. The use of a directional control valve adapted to a pressure responsive displacement control mechanism as a means of selectively varying the displacement of a fluid pump is also known as is the use of a remotely controlled pilot operated pressure relief valve as a means of reducing the pump operating pressure to a predetermined lower value. Use of a variable displacement pump which can have its flow regulated to maintain a plurality of flow rates with automatic pressure compensation is likewise known. This can be accomplished by introducing a signal pressure on to two separate pistons that are in contact with the swashplate of a pressure compensated pump. The use of a variable displacement pump having means disposed therewithin for sensing discharge pressure and thus causing the pump to vary its displacement also is known to the art as is the use of a control valve which when actuated will cause the pump to work at a lower displacement and when actuated to a greater degree will cause the pump to approach minimum displacement.

While pressure compensated two level pressure operation is known for fluid delivery circuits such systems are not available which include a safely feature which prevents the delivery of pressurized fluid from the pump of the system at a pressure in a higher operating range whenever a work element which will be damaged by pressurized fluid in said higher operating range is connected to the pressure delivery circuit.

SUMMARY OF THE INVENTION

The present application is directed to overcoming one or more of the problems as set forth above.

According to the present invention a multi-range pressure compensated fluid delivery system is provided which gives a pressure compensated output flow over at least two independent pressure ranges. The system comprises a variable displacement pump driven by a prime mover and having an inlet connected to a source of hydraulic fluid and an outlet delivering pressurized fluid. A fluid delivery circuit is connected to the output. The fluid delivery circuit has at least two work circuits selectively connected thereto. A first of the work circuits is safely operable up to a first pressure and a second of the work circuits is safely operable only up to a second pressure which is less than the first pressure. An actuator system is connected to the pump to control its displacement responsive to a pressure applied thereto. Means are provided for selectively applying a first signal determined by the first pressure to the actuator system to adjust the displacement of the pump. Means are also provided for reducing the first signal to the second signal responsive to connection of the second circuit to the fluid delivery circuit and thereby decreasing the operating pressure of the pump.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENTS

Figure 1:
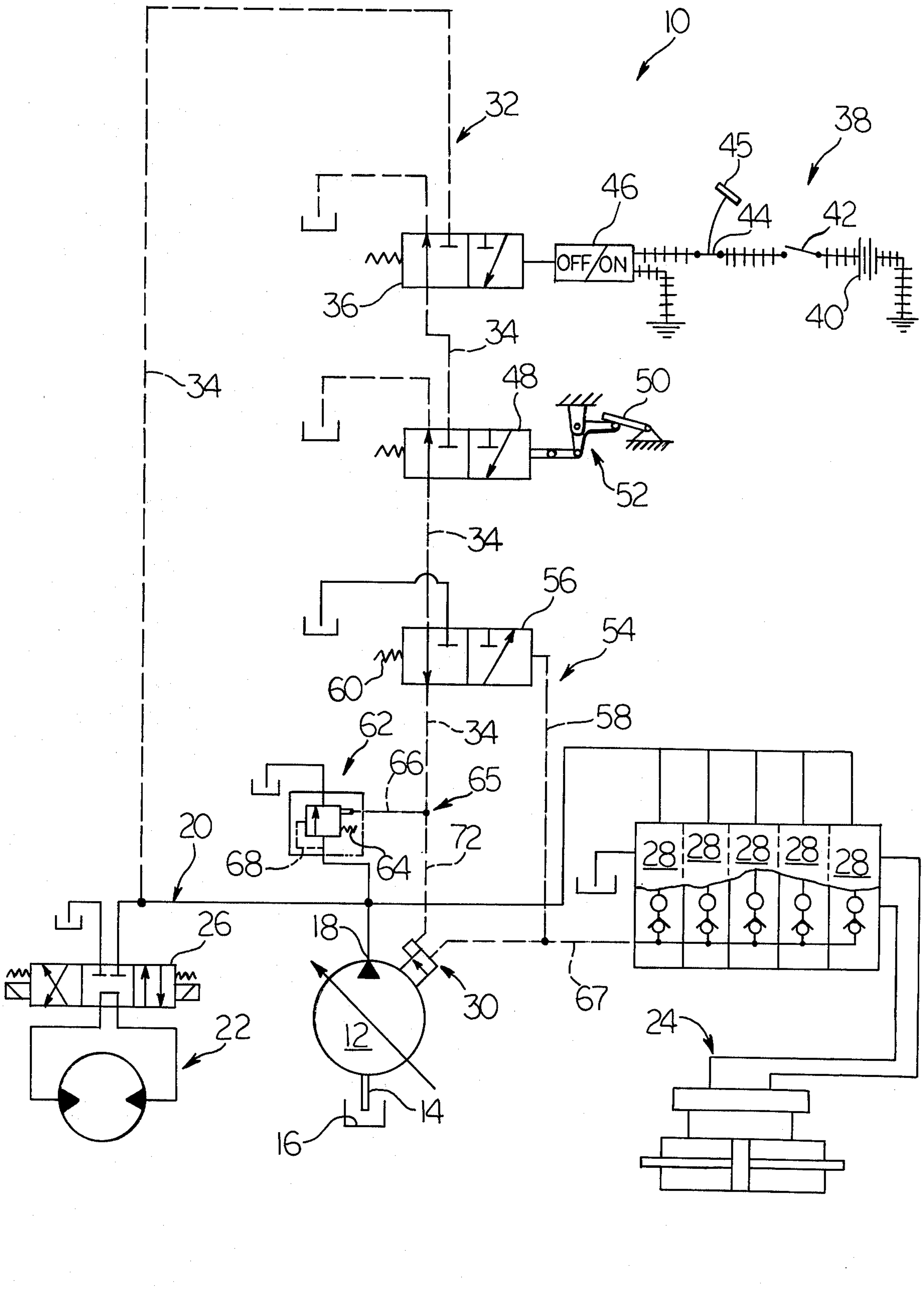
FIG. 1 illustrates schematically a multi-range pressure compensated fluid delivery system giving pressure compensated output flow over at least two independent pressure ranges in accordance with the present invention.

Adverting first to FIG. 1 there is illustrated therein a multi-range pressure compensated fluid delivery system 10 in accordance with the present invention. The system 10 is capable of giving pressure compensated output flow over at least two independent pressure ranges in a manner which will become apparent from the description which follows. The system 10 includes a variable displacement pump 12 driven by a prime mover (not shown) and having an inlet 14 connected to a source of hydraulic fluid such as a sump 16 and an outlet 18 which delivers pressurized fluid. A fluid delivery circuit 20 is connected to the outlet 18. The fluid delivery circuit 20 has at least two work circuits, in the embodiment illustrated a first work circuit 22 which may comprise, for example, a front wheel drive for a vehicle such as a motorgrader and one or more second work circuits 24 for controlling implements or accessories. The first work circuit 22 is selectively connected to the fluid delivery circuit 20 by a valve 26. Each of the second work circuits 24, one of which is illustrated in FIG. 1, is connected to the fluid delivery circuit 20 via a respective control valve 28.

The first work circuit 22 is safely operable up to a first pressure such as for example 4500 psi whereas the second work circuits 24 are safely operable only up to a second pressure, for example 3500 psi which is less than the first pressure. It is of course possible to design the second work circuits 24 from such materials and in such a manner that it will also be operable at the aforementioned first pressure but this would require adding considerable weight to the system, greatly increasing the cost of the components thereof and generally using a highly over designed system for the second work circuits 24. Generally only the first work circuit 22 will be required to operate at such a high operating pressure as for example when the first work circuit 22 is a front wheel drive circuit for a vehicle and is thus required to develop high torque.

An actuator system 30 is connected to the pump 12 to control its displacement to be responsive and generally proportional to a pressure applied to the actuator system 30. Such systems are known in the art for providing a dual pressure range pumping system. A three or even four pressure range actuator system can be constructed following generally the teachings of the prior art.

Selective pressure applying means 32 is provided for selectively applying a first signal via a first signal line 34 to the actuctor system 30 to adjust the displacement of the pump 12. The selective pressure applying means 32 comprises a normally blocked first valve 36 which receives flow from the pump via the first signal line 34 along with first valve opening means 38 which comprises a power source 40, e.g., a battery, a main switch 42 and a switch 44, operated responsive to movement of a clutch 45 which, when both the main switch 42 and the clutch operated switch 44 are closed, serves to operated a solenoid 46 which serves to switch the normally closed first valve 36 into an open position. The selective pressure applying means 32 also includes a normally blocked second valve 48 which receives flow from the first valve 36 when the first valve 36 is open via a continuation of the first signal line 34. Still further part of the selective pressure applying means 32 are means for selectively opening the second valve 48. In the embodiment as illustrated in FIG. 1 the means for selectively opening the second valve 48 comprises a pedal 50 which via mechanical linking means 52 propels the second valve 48 into its open position.

Control signal pressure reducing means 54 form an important part of the present invention. The control signal pressure reducing means 54 serves to lower the first signal which is determined by the first pressure to a second signal which is determined by the second pressure responsive to connection of any one of the second work circuits 24 to the fluid delivery circuit 20. Thereby, the operating pressure of the pump 12 is decreased due to a reduction in the pressure applied to the actuator system 30. In the preferred embodiment of the invention as illustrated the control signal pressure reducing means 54 comprises a third valve 56 in the signal line 34 between the second valve 48 and the actuator system 30. The third valve 56 has a first position in which the second valve 48 communicates therethrough with the actuator system 30 and a second position in which the actuator system 30 communicates through the third valve 56 to the sump 16. Second pressure applying means, in the embodiment illustrated a second signal line 58 serves to apply the second pressure, namely the pressure of any one of the second work circuits 24, to close the third valve 56 whenever the second pressure reaches a preselected value as determined by biasing means 60 of the third valve 56. In practice, this valve shifts whenever pressure is present in second signal line 58. The biasing means 60 is only made strong enough to assure valve stem return. Thus, when any control valve 28 is shifted to supply pressure to any one of the second work circuits 24, the second signal line 58 takes a signal to the third valve 56 which shifts it leftwardly against the force of the biasing means 60 whereby the third valve 56 communicates the first signal line 34 with the sump 16 thus reducing the pressure applied to the actuator system 30 and consequently reducing the operating pressure of the pump 12.

Pressure relief valve means 62 are connected to the pump outlet 18. For use in a multi-range system the pressure relief valve 62 must be biased not only by a selectively fixed biasing means 64 but must also be biased by variable biasing means 65 which comprises a pressure signal representative of the pressure between the third valve 56 and the actuator system 30. This pressure signal is applied to the pressure relief valve means 62 in the embodiment illustrated via a third signal line 66 whereby it is applied to the pressure relief valve means 62 additively to the selectably fixed biasing means 64. Meanwhile, pilot conduit means 68 delivers a signal representative of the pressure of the pump 12 to oppose the sum of the selectably fixed biasing means 64 and the signal delivered by the pilot conduit means 68.

OPERATION

The pump 12 would normally supply fluid to the outlet thereof 18 and therefrom to the fluid delivery circuit 20 in a third pressure range, say from 0 to 2000 psi. This pressure would then be used by any one of the second work circuits 24 as controlled by the respective control valve 28. Whenever the pressure in any of the work element ureaus 24 reaches, e.g., 1800 psi, the signal is passed via a line 67 to the actuator system 30 which causes the pump 12 to increase operating pressure to the operating range, e.g., 2,000 to 3,500 psi. If desired, pressure can also be applied to the first work circuit 22, which might be the front wheel drive circuit of a vehicle such as a motor grader or other earth working vehicle. The valve 26 controls flow to the first work circuit 22 in a conventional manner. Generally with such heavy earthworking equipment as motorgraders and the like the pressure supplied by the pump 12 would be insufficient to provide extra torque to the first work circuit 22. In such a case the operator can depress the pedal 50 after switching on the main switch 42 and engaging the clutch 45 whereby the demand pressure of the first work circuit 22 is transmitted via the first signal line 34 and the first valve 36 which is then open to the second valve 48. Depression of the pedal 50 causes the second valve 48 to also open whereby flow is introduced to the third valve 56. The third valve 56 being normally opened allows flow therethrough to the actuator system 30 which then shifts the pump 12 to increase operating pressure whereby the pressure delivered to the fluid delivery circuit 20 is increased. Such an increase would normally be in a stepwise fashion whereby the pump 12 would then be operating, for example, in the first operating range, e.g., up to 4500 psi. The pressure relief valve 62 would have its biasing upgraded via the third signal line 66 for operation up to the 4500 psi pressure range.

If one or more of the second work circuits 24 are actuated via a respective one of the control valves 28, a second pressure which is the maximum working pressure of one of the second work circuits 24 is delivered to the third valve 56 via the second signal line 58 in opposition to the biasing means 60 of the third valve 56. The signal delivered via the second signal line 58 shifts the third valve 56 leftwardly in FIG. 1 whereby the pressure delivered to the actuator system 30 is vented to the sump 16 thus shifting the pump 12 to a lower operating range, for example the third operating range, e.g., 0 to 2000 psi or the second operating range, e.g., 2000 to 3500 psi, dependent upon the pressure in any of the work elements 24. Thus, even though the pedal 50 is depressed, the higher operating pressure cannot be delivered to the second work circuit 24. It is of course understood that the pressure in the first work circuit 22 is likewise reduced by the reduction in maximum compensated pressure setting of the pump 12 caused by the venting of the pressure applied to the actuator system 30. Thus, for example, the first work circuit 22 may be vented to the third pressure range, e.g., 2000 psi.

ALTERNATE EMBODIMENT

Adverting to FIG. 2 there is illustrated therein an alternate embodiment of the present invention which includes all of the components previously described operating in the manner previously mentioned and which further includes certain additional features as will be described in the following.

Figure 2:
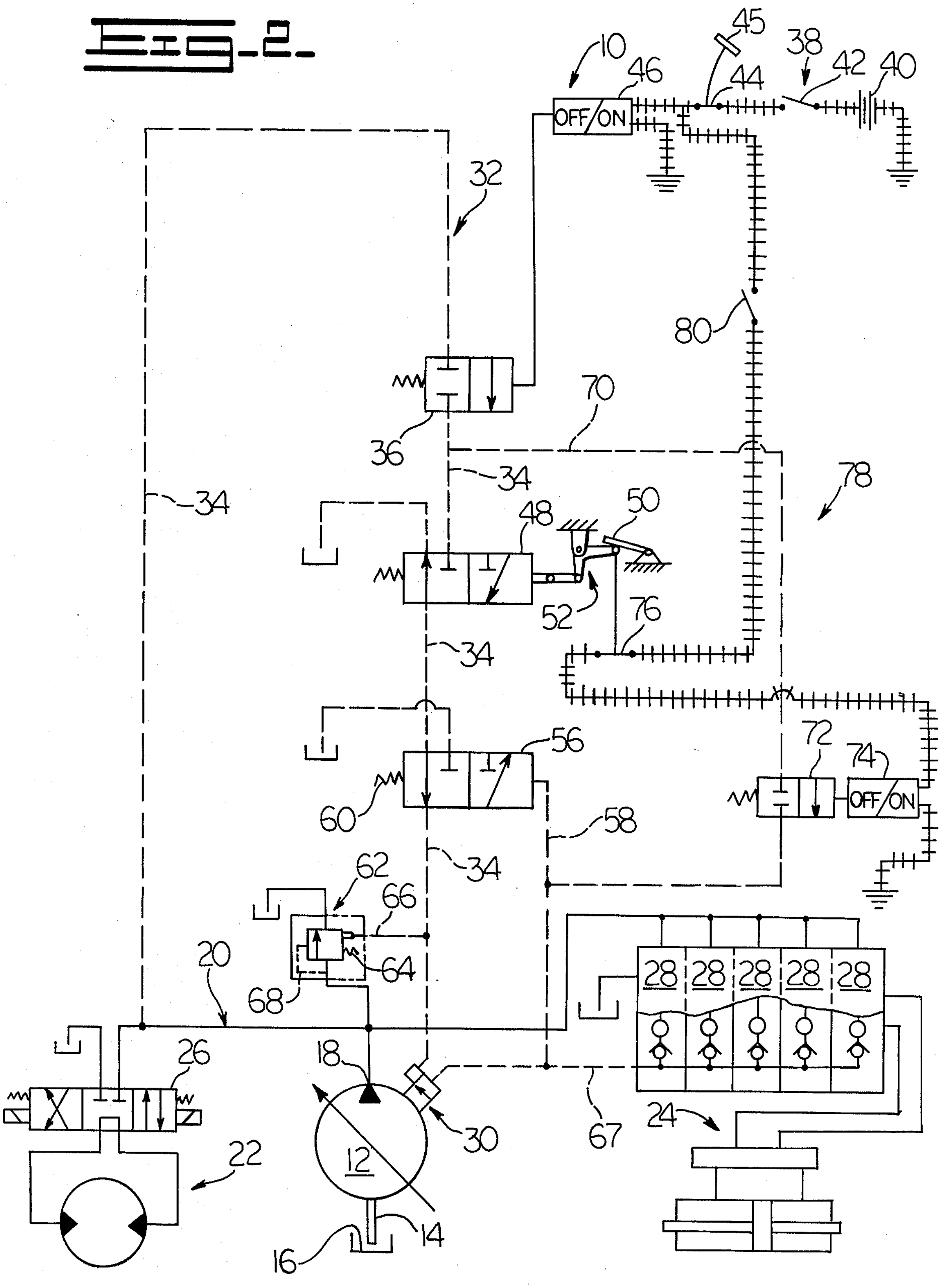
FIG. 2 illustrates schematically an embodiment of the present invention which has certain advantageous features added thereto.

The embodiment illustrated in FIG. 2 includes means for selectively allowing the first work circuit 22 to be operated at the second operating pressure range even when the second work circuits 24 are not operating. To accomplish this a fourth signal line 70 is provided from the fluid delivery circuit 20, and more particularly in the embodiment illustrated from the first signal line 34, to the second signal line 58, to compensator 30. Also, fourth valve 72 operated by a solenoid 74 is provided in the fourth signal line 70. Whenever the pedal 50 is depressed the solenoid 74 must be off due to opening of a pedal switch 76 thus setting the fourth valve 72 in a closed position whereby no signal is delivered by the fourth signal line 70 when the pedal 50 is depressed.

When the pedal 50 is not depressed the pedal switch 76 does not break a fourth valve operating circuit 78 which can be activated by closing a fourth valve control switch 80 in the fourth valve operating circuit 78. Thus, when it is desired to operate the first work circuit 22 at a lower operating pressure, the pressure in the fluid delivery circuit 20 representative of the pressure within the first work circuit 22 is delivered via the first signal line 34 and the fourth signal line 70, when the fourth valve control switch 80 is closed and the pedal 50 is not depressed, to the second signal line 58. In this manner the third valve 56 is shifted leftwardly to vent the actuator system 30 whenever pressure in the first work circuit 22 or any one of the second work circuits 24 exceeds the strength of the biasing ureaus of the third valve 56 i.e., the weak spring 60. It is also clear that whenever the pedal 50 is depressed the system 10 illustrated in FIG. 2 will operate identically to the system 10 illustrated in FIG. 1.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property of privilege is claimed are defined as follows:

1. A multi-range pressure compensated fluid delivery system giving pressure compensated output flow over at least two independent pressure ranges, comprising:

a variable displacement pump driven by a prime mover and having an inlet connected to a source of hydraulic fluid and an outlet delivering pressurized fluid;

a fluid delivery circuit connected to said outlet having at least two work circuits selectively connected thereto, a first of said circuits being safely operable up to a first pressure and a second of said circuits being safely operable only up to a second pressure, said first pressure exceeding said second pressure;

an actuator system connected to said pump to control its displacement responsive to a pressure applied thereto;

means for selectively applying a first signal determined by said first pressure to said actuator system to adjust the displacement of said pump; and means for reducing said first signal to a second signal determined by said second pressure responsive to connection of said second circuit to said fluid delivery circuit and thereby decreasing the operating pressure of said pump.

2. A system as in claim 1, wherein said first pressure signal applying means comprises:

normally blocked first valve means receiving flow from said pump;

means for selectively opening said first valve means;

normally blocked second valve means receiving flow from said first valve means when it is open; and means for selectively opening said second valve means.

3. A system as in claim 2, wherein said first signal pressure reducing means comprises;

third valve means between said second valve means and said actuator system having a first position in which said second valve means communicates therethrough with said actuator system and a second position in which said actuator system communicates therethrough to sump means; and means applying said second pressure to close said third valve means.

4. A system as in claim 3, including:

pressure relief valve means connected to said pump outlet;

selectably fixed biasing means biasing said pressure relief valve closed;

pilot conduit means delivering a signal representative of pump pressure to oppose said biasing means; and variable biasing means comprising a pressure signal representative of the pressure between said third valve means and said actuator system applied to said pressure relief valve additively to said selectably fixed biasing means.

5. A system as in claim 2, wherein said first valve means comprises solenoid actuated first valve means and said selective opening means therefor comprises electric switch means and power source means.

6. A system as in claim 2, wherein said second valve opening means comprises mechanical linkage means.

7. A system as in claim 6, wherein said first circuit comprises a front wheel drive circuit of an earthworking vehicle.

8. A system as in claim 3, including:

means applying said first signal to close said third valve means when said first signal is not applied to said actuator system.

9. A system as in claim 8, wherein said first pressure applying means comprises:

a signal line applying said first signal to close said third valve means; and operator controllable fourth valve means in said signal line.

10. A system as in claim 9, wherein said fourth valve means is solenoid actuated and including:

electric circuit means for actuating said fourth valve means; and an electric switch in said electric circuit operating responsive to opening of said second valve means to close said fourth valve means.

11. A system as in claim 10, including:

pressure relief valve means connected to said pump outlet;

selectably fixed biasing means biasing said pressure relief valve closed;

pilot conduit means delivering a signal representative of pump pressure to oppose said biasing means; and variable biasing means comprising a pressure signal representative of the pressure between said third valve means and said actuator system applied to said pressure relief valve additively to said selectably fixed biasing means.

12. A system as in claim 11, wherein said first valve means comprises solenoid actuated first valve means and said selective opening means therefor comprises electric switch means and power source means.

13. A system as in claim 12, wherein said second valve opening means comprises mechanical linkage means.

14. A system as in claim 13, wherein said first circuit comprises a front wheel drive circuit of an earthworking vehicle.

15. A control system for a variable displacement pump the displacement of which is controlled by an actuator system responsive to a pressure applied thereto which controls said pump to give pressure compensated output flow in at least two independent pressure ranges responsive to a first signal from a first work circuit operating selectively at a first of said pressure ranges and to a second signal from a second work circuit operating selectively at a second of said pressure ranges, said second pressure range being generally lower than said first pressure range, comprising:

means for selectively applying said first signal to said actuator system as said pressure applied thereto; and means for reducing said first signal to said second signal responsive to connection of said second work circuit to receive said pump output flow and thereby decreasing the operating pressure of said pump.

16. A system as in claim 15, wherein said first pressure signal applying means comprises:

normally blocked first valve means receiving flow from said pump;

means for selectively opening said first valve means;

normally blocked second valve means receiving flow from said first valve means when it is open; and means for selectively opening said second valve means.

17. A system as in claim 16, wherein said first signal reducing means comprises:

third valve means between said second valve means and said actuator system having a first position in which said second valve means communicates therethrough with said actuator system and a second position in which said actuator system communicates therethrough to sump means; and means applying said second signal to close said third valve means.

18. A system as in claim 17, including:

pressure relief valve mens connected to said pump outlet;

selectably fixed biasing means biasing said pressure relief valve closed;

pilot conduit means delivering a signal representative of pump pressure to oppose said biasing means; and variable biasing means comprising a pressure signal representative of the pressure between said third valve means and said actuator system applied to said pressure relief valve additively to said selectably fixed biasing means.

19. A system as in claim 18, wherein said first valve means comprises solenoid actuated first valve means and said selective opening means therefor comprises electric switch means and power source means.

20. A system as in claim 19, wherein said second valve opening means comprises mechanical linkage means.

21. A system as in claim 17, including:

means applying said first signal to close said third valve means when said first signal is not applied to said actuator system.

22. A system as in claim 21, wherein said first pressure applying means comprises:

a signal line applying said first pressure to close said third valve means; and operator controllable fourth valve means in said signal line.

23. A system as in claim 22, wherein said fourth valve means is solenoid actuated and including:

electric circuit means for actuating said fourth valve means; and an electric switch in said electric circuit operating responsive to opening of said second valve means to close said fourth valve means.

24. A system as in claim 23, including:

pressure relief valve means connected to said pump outlet;

selectably fixed biasing means biasing said pressure relief valve closed;

pilot conduit means delivering a signal representative of pump pressure to oppose said biasing means; and variable biasing means comprising a pressure signal representative of the pressure between said third valve means and said actuator system applied to said pressure relief valve additively to said selectably fixed biasing means.

25. A system as in claim 24, wherein said first valve means comprises solenoid actuated first valve means and said selective opening means therefor comprises electric switch means and power source means.

26. A system as in claim 25, wherein said second valve opening means comprises mechanical linkage means.

27. A system as in claim 26, wherein said first circuit comprises a front wheel drive circuit of an earthworking vehicle.

* * * * *